Oct. 14, 1958 K. BOFINGER 2,856,046
ELECTROMAGNETICALLY OPERATED OVERLOAD RELEASE CLUTCH
Filed Jan. 20, 1956 2 Sheets-Sheet 1
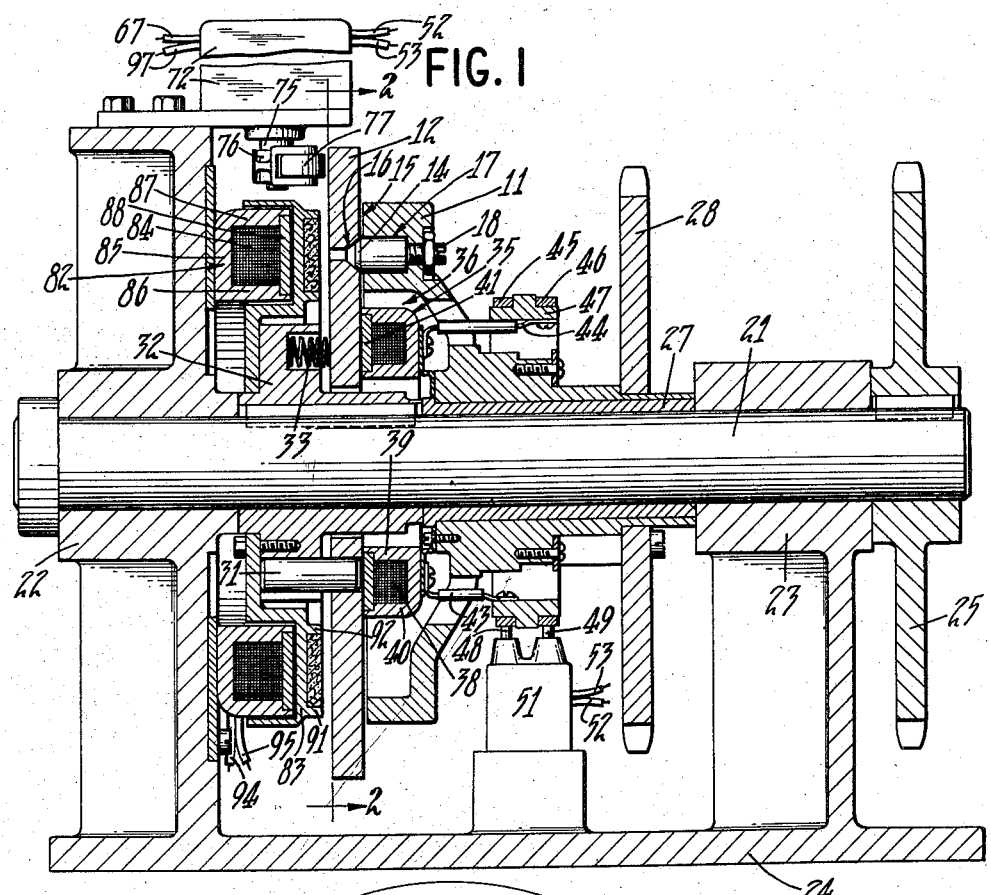
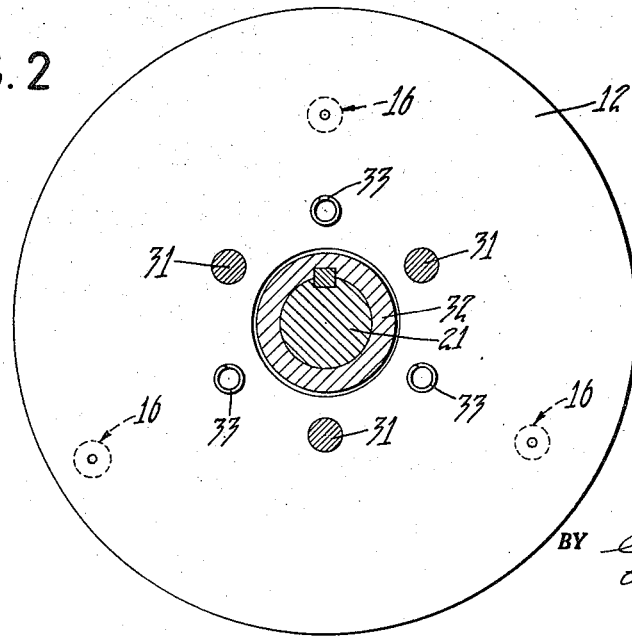
INVENTOR.
KARL BOFINGER
BY Charles H. Bune
Leland R. McCann
George W. Reiber
ATTORNEYS Oct. 14, 1958  K. BOFINGER  2,856,046
ELECTROMAGNETICALLY OPERATED OVERLOAD RELEASE CLUTCH
Filed Jan. 20, 1956  2 Sheets-Sheet 2

INVENTOR.
KARL BOFINGER
BY Charles H. Erne
Leland R. McCann
George W. Reifer
ATTORNEYS United States Patent Office 2,856,046
Patented Oct. 14, 1958

2,856,046

ELECTROMAGNETICALLY OPERATED OVER-
LOAD RELEASE CLUTCH

Karl Bofinger, Cincinnati, Ohio, assignor to American Can Company, New York, N. Y., a corporation of New Jersey Application January 20, 1956, Serial No. 560,333

6 Claims. (Cl. 192—56)

The present invention relates to a driving clutch mechanism for machines and has particular reference to devices for holding driven members of slip clutches in declutched relation following a declutching operation.

In certain kinds of machines, slip clutches are utilized to yieldably connect driven parts of the machine with driving parts. In some of these slip clutches certain of the driven members are displaced from the driving members through slippage of the driven members to effect a declutching operation. This displacement usually is brought about by seated elements which unseat and reseat several times during a machine stopping operation with the result that the clutch parts are subject to considerable wear and tear.

An object of the instant invention is the provision in a slip driving clutch mechanism of improved devices for holding certain of the driven members of the clutch in a declutched position during the stopping of a machine so as to prevent undesired reclutching with its resulting wear and tear on the clutch members.

Another object is the provision of such a holding device which is instantaneous in action and which operates to hold the declutched members against reclutching without interfering with other movements of the clutch members.

Another object is the provision of such a holding device which can be actuated electrically so as to control the device remotely and through an electrical impulse.

Numerous other objects and advantages of the invention will be apparent as it is better understood from the following description, which, taken in connection with the accompanying drawings, discloses a preferred embodiment thereof.

Referring to the drawings:

Figure 1 is a sectional view of a slip clutch mechanism embodying the instant invention, parts being broken away;

Fig. 2 is a sectional view taken substantially along the line 2—2 in Fig. 1.

Figure 3:
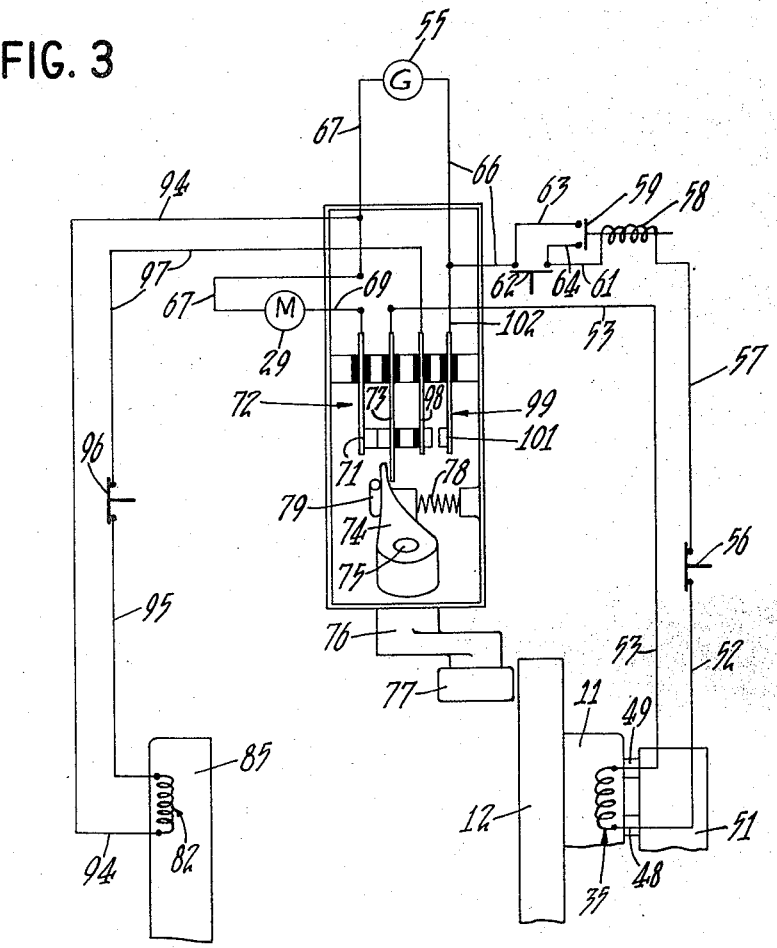
Fig. 3 is a wiring diagram of the electrical apparatus used in the clutch mechanism.

As a preferred or exemplary embodiment of the instant invention the drawings illustrate a slip driving clutch mechanism which may be mounted as a single unit for connecting elements of two devices or portions of a single machine or of two adjacent separate machines for driving one of the devices, portions or machines from the other in timed relation therewith and for disconnecting or disengaging one device, portion or machine from the other when an abnormal working condition occurs.

The slip driving clutch mechanism essentially comprises a rotatable clutch driving head or member 11 (Fig. 1) and an adjacently disposed yieldably mounted slip plate 12 driven or rotated by the clutch member 11. The clutch member 11 and the slip plate 12 normally rotate in unison and are retained in synchronized relation by timing or displacement instrumentalities which are projections 14 which preferably are short pins having tapered outer noses projecting beyond a flat face 15 of the clutch member 11 and seated in shallow recesses 16 having at least one tapered wall formed in the slip plate 12. The pins 14 are disposed in bores 17 formed in the clutch member 11. Adjustable set screws 18 in the clutch member 11 hold the pins 14 in a predetermined position.

The drawings show three sets of projections or pins 14 and their cooperating recesses 16 in angularly spaced relation and each of these sets are located radially a different distance from the axis of the driving clutch members 11 as shown in Fig. 2 so that each projection will seat only in its own recess and thereby maintain proper timed relation between the slip plate 12 and the clutch driving member 11 upon re-engagement after a declutching operation as will be more fully explained hereinafter.

The driven parts of the device, portion of a machine, or entire machine are driven through the slip plate 12 by a driven shaft or member 21 (Fig. 1) which is journaled adjacent its ends in a pair of spaced bearings 22, 23 formed in a bracket 24. A sprocket 25 mounted on the shaft 21 adjacent the bearing 23 is utilized to connect the machine parts with the driven shaft 21.

The driving clutch member 11 preferably is mounted freely on a bearing sleeve 27 which is carried on the driven shaft 21 intermediate its bearings 22, 23 for compactness of design. This clutch member 11 is driven by a sprocket 28 which is secured to the clutch member and which in turn is driven in any suitable manner, preferably by an electric motor 29 indicated in the wiring diagram in Fig. 3.

The slip plate 12 preferably is slideably mounted for axial movement relative to the clutch member 11, on a set of three support pins 31 (Figs. 1 and 2) which are carried in a hub 32 mounted on and keyed to the driven shaft 21 for rotating the shaft. Compression springs 33 interposed between the hub 32 and the slip plate 12 provide yieldability for the plate and lightly press it toward the clutch member 11 to keep the projections 14 engaged in their seats 16 in the plate.

Driving rotation of the slip plate 12 by the clutch member 11 preferably is effected through a magnet 35, preferably an electromagnet, of ring shape. This magnet surrounds the driven shaft 21 and is secured to the clutch member 11 in a recess 36 formed therein for rotation with the clutch member. The electromagnet 35 preferably comprises an annular coil 38 surrounded by a U-shaped annular housing constituting inner and outer radially spaced pole pieces 39, 40 which terminate in engagement with an armature 41 disposed adjacent the flat face 15 of the clutch member 11.

The magnet 35 preferably is maintained in a normally energized condition to attract and hold the slip plate 12 in substantially driving engagement with the magnet armature 41 for rotating the slip plate in unison with the clutch member. For this purpose the magnet 35 is connected by wires 43, 44 to a pair of collector rings 45, 46 which surround the axis of the driven shaft 21 and are disposed in an insulating ring 47 connected to the clutch member 11. The collector rings 45, 46 operate against respective contacts 48, 49 or a commutator 51 secured to the unit bracket 24.

The commutator 51 is connected by a pair of wires 52, 53 to a normally closed electric circuit which includes the electric motor 29 and a source of electric current such as a generator 55 (see Fig. 3). In this circuit commutator wire 52 is connected to one or more control switches 56 which are distributed throughout the machine at points of potential irregularities as hereinbefore mentioned. The switch or switches 56 are connected by a wire 57 to a relay solenoid 58 of a normally open relay switch 59. The solenoid 58 also is connected by a wire 61 to a normally open starting switch 62 having contacts connected by by-pass wires 63, 64 to the normally open contacts of the relay switch 59. The starting switch 62 is also connected by a wire 66 to one side of the generator 55. The other side of the generator is connected by a wire 67 to the motor 29 which in turn is connected by a wire 69 to a stationary contact 71 of a normally closed operating switch 72. A movable contact 73 of the switch 72 is connected to the wire 53 which is connected to the commutator 51.

To start the machine, the start switch 62 is manually closed momentarily. This establishes the circuit and causes electric current to flow through the relay solenoid 58 and thus close the relay switch 59 and thereby set up a holding circuit through the wires 63, 64 to by-pass the starting switch 62 so as to keep the circuit established when the starting switch is released. With the relay switch 59, the control switches 56, and the operating switch 72 all closed, the electric current sets the motor 29 in operation and energizes the driving magnet 35 to set the driving members in operation and to rotate the driven members through the driving members. This normal operation continues as long as no overload or irregularities occur which would trip and open any one of the control switches 56.

When a control switch 56 is opened it breaks the circuit and the driving magnet 35 is immediately deenergized. This deenergization of the magnet causes it to release its hold on the driven slip clutch plate 12 and the plate thereupon tends to drag and slip back relative to the magnet thereby causing it to ride up on the clutch member projections 14 and become displaced axially away from the magnet so as to actuate and open the switch 72 to insure that the magnet 35 is kept deenergized until investigation of the cause of the opening of the control switch 56 is completed.

Opening of the operating switch 72 is effected by an arm 74 (Fig. 3) which is connected by a pivot shaft 75 to an auxiliary arm 76 carrying a roller 77 which is disposed adjacent the outer face of the slip plate 12. When the plate 12 is displaced outwardly by the clutch projections 14, the plate pushes against the roller 77 and thereby pivots the arms 74, 76. The arm 74 engages against the movable contact 73 of the operating switch 72 and hence when pivoted opens the switch. A compression spring 78 exerting a pressure against the arm 74 normally keeps the arm engaged against a stop pin 79 to keep the switch closed in its normal condition.

Slippage of the slip plate 12 to declutch the plate as above described also takes place when a distinct overload in the driven section of the machine occurs, except that in this case the overload tends to retard and cause the slip plate 12 to slip and become displaced and thereby open the operating switch 72 first. The opening of this switch 72 breaks the circuit initially instead of one of the control switches 56 and thereby deenergizes the magnet 35 to release the slip plate 12 from the magnet. In either of these cases the motor 29 in the circuit becomes deenergized and stops to cease operation of the entire machine.

It should be understood that in stopping the machine the working parts continue to rotate through several rotations before complete stoppage is obtained. To prevent seating and unseating of the projections 14 in their seats 16, with resulting undue wear and tear on the clutch parts during the stopping rotations of the machine parts, the slip plate 12 upon initial displacement from the clutch member 11, is held in its displaced position, away from the projections 14 so that re-engagement of the projections in the seats 16 is prevented. Thus during the time the machine parts are rotating to a standstill, the slip plate 12 is clear of the projections 14.

This holding of the slip plate 12 in its displaced position preferably is effected magnetically through a stationary normally deenergized electromagnet 82 (Fig. 1) and an adjacently disposed holding ring or armature 83 which rotates with the slip plate 12. The electromagnet 82 preferably comprises an annular shaped coil 84 encased in an annular housing 85 surrounding the driven shaft 21 and secured to the bracket 24 adjacent the driven shaft bearing 22. The coil housing 85 is formed with a pair of radially spaced concentric inner and outer pole pieces 86, 87 which terminate adjacent the outer face of the slip plate 12 and which are bridged across by an armature plate 88.

The holding ring or armature 83 which rotates with the slip plate 12 is disposed between the electromagnet 82 and the slip plate 12 and is permanently secured to the driven hub 32. This holding ring 83 upon energization of the electromagnet 82, receives induced magnetic lines of force from the magnet 82 and thus attracts and holds the slip plate 12 when the latter is displaced into close position to the ring, while the slip plate continues to rotate. To facilitate this holding action the face of the holding ring 83 is formed with a shallow annular recess which sets off a pair of radially spaced concentric ribs 91, 92 which serve as auxiliary pole pieces.

Energization of the holding magnet 82 is effected in time with the displacement of the slip plate 12. For this purpose one side of the magnet 82 is connected by a wire 94 (Fig. 3) to the generator wire 67. The other side of the magnet is connected by a wire 95 to a normally closed manually operated circuit breaker 96 which in turn is connected by a wire 97 to a movable contact 98 of a normally open holding magnet switch 99. The movable contact 98 is connected to and is insulated from the movable contact 73 of the operating switch 72 for movement simultaneously therewith. The opposite contact 101 of the holding magnet switch 99 is connected by a wire 102 to the generator wire 66.

Hence when the normally closed operating switch 72 is opened by slippage and displacement of the slip plate 12, the holding magnet switch 99 is closed and this establishes the holding circuit and energizes the holding magnet 82. Thus this double action releases the slip plate 12 from the driving magnet 35 and simultaneously holds the released plate away from the timing projections 14 as hereinbefore described. The normally closed circuit breaker 96 in the circuit is manually opened to deenergize the holding magnet 82 to release the slip clutch 12 for reengagement with timing projections 14 when the machine is ready for restarting.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A driving clutch mechanism for machines comprising in combination a driving clutch member, a driven slip clutch plate member engageable with said driving clutch member for movement therewith, instrumentalities operable against said slip clutch plate member through slippage of said plate member relative to said clutch member to disengage said plate member from said clutch member, a stationary magnet disposed adjacent the path of travel of said slip plate member, and an element disposed between said magnet and said plate member and movable with said plate member for receiving magnetic forces from said magnet and for attracting and holding said plate member in a separated position from said clutch member upon disengagement therefrom.

2. A driving clutch mechanism of the character defined in claim 1 wherein said stationary magnet is a normally deenergized electromagnet and wherein there is provided an electric switch connected to said electromagnet and operable by said plate member upon its disengagement from said clutch member for energizing said electromagnet and said movable element to hold said plate member in its disengaged position.

3. A driving clutch mechanism of the character defined in claim 1 wherein said clutch member and said plate member are axially aligned rotatable members and said magnet and said movable element are axially aligned with said plate member.

4. A driving clutch mechanism of the character defined in claim 1 wherein said magnetic means is a stationary normally deenergized plate holding electromagnet and wherein there is provided a normally energized electromagnet in said clutch member for attracting said plate member to said clutch member for driving in unison, and wherein there is provided switch means connected to said electromagnets and operable by said plate member upon slippage of said plate member for deenergizing said clutch member electromagnet to release said plate member from said clutch member and for simultaneously energizing said plate holding electromagnet for attracting said plate member through said movable element to hold said plate member against re-engagement with said clutch member.

5. A driving clutch mechanism of the character defined in claim 1 wherein there is provided a normally energized electromagnet in said clutch member for attracting said plate member to said clutch member for movement in unison, and wherein there is provided an electric switch connected to said electromagnet and operable by said plate member upon slippage of said plate member for deenergizing said electromagnet to release said plate member from said clutch member.

6. A driving clutch mechanism for machines comprising in combination a driving clutch member, a driven slip clutch plate member engageable with said driving clutch member for movement therewith, instrumentalities operable against said slip clutch plate member through slippage of said plate member relative to said clutch member to disengage said plate member from said clutch member, normally deenergized electromagnetic means disposed adjacent said plate member and having an armature rotatable therewith for holding said plate member in a disengaged position from said clutch member when said means is energized, a normally energized electromagnet in said clutch member for attracting said plate member to said clutch member for driving in unison, and switch means connected to said electromagnetic means and said clutch member electromagnet and operable by said plate member upon slippage of said plate member for deenergizing said clutch member electromagnet to release said plate member from said clutch member and for simultaneously energizing said electromagnetic means to attract and to hold said plate member against re-engagement with said clutch member.

References Cited in the file of this patent

UNITED STATES PATENTS

| | | |
|---|---|---|
| 2,068,260 | Biggert | Jan. 19, 1937 |

FOREIGN PATENTS

| | | |
|---|---|---|
| 873,024 | Germany | Apr. 9, 1953 |
| 892,405 | Germany | Oct. 8, 1953 |